(12) United States Patent
Mori et al.

(10) Patent No.: US 6,484,398 B2
(45) Date of Patent: Nov. 26, 2002

(54) HEAT EXCHANGER TUBE MANUFACTURING METHOD

(75) Inventors: Hiroaki Mori, Aida-gun (JP); Hirofumi Okamoto, Tsuyama (JP)

(73) Assignee: Mori Machinery Corporation, Okayama (JP)

( * ) Notice: Subject to any disclaimer, the term of this patent is extended or adjusted under 35 U.S.C. 154(b) by 0 days.

(21) Appl. No.: 09/566,600

(22) Filed: May 8, 2000

(65) Prior Publication Data

US 2002/0148117 A1 Oct. 17, 2002

(30) Foreign Application Priority Data

Jun. 8, 1999 (JP) .......................................... 11-160635

(51) Int. Cl.[7] .............................................. B21D 21/00
(52) U.S. Cl. .................................................. 29/890.053
(58) Field of Search ........................... 29/890.053, 557; 165/133; 72/203, 240, 252.5, 365.2, 366.2, 370.16, 367.1, 368, 370.19, 370.21, 379.6, FOR 100

(56) References Cited

U.S. PATENT DOCUMENTS

| | | | | | |
|---|---|---|---|---|---|
| 5,201,117 A | * | 4/1993 | Wright | ................... | 29/890.053 |
| 5,351,397 A | * | 10/1994 | Angeli | ................... | 29/890.053 |
| 5,768,782 A | * | 6/1998 | Kato | ..................... | 29/890.053 |
| 6,014,988 A | * | 1/2000 | Gagnon et al. | ............. | 138/168 |
| 6,061,905 A | * | 5/2000 | Logic | .......................... | 29/33 T |
| 6,067,712 A | * | 5/2000 | Randlett et al. | ............. | 165/133 |

* cited by examiner

Primary Examiner—I. Cuda-Rosenbaum
(74) Attorney, Agent, or Firm—Koda & Androlia

(57) ABSTRACT

A heat exchanger tube manufacturing method to manufacture heat exchanger tubes in a production line. The method includes the steps of molding a plurality of dimples in a plate material, which is payed out continuously, folding back the molded plate material along an axis extending in the direction in which the plate material is payed out to form the molded plate material into an intermediate tube body and cutting the intermediate tube body into parts of a predetermined length.

5 Claims, 5 Drawing Sheets

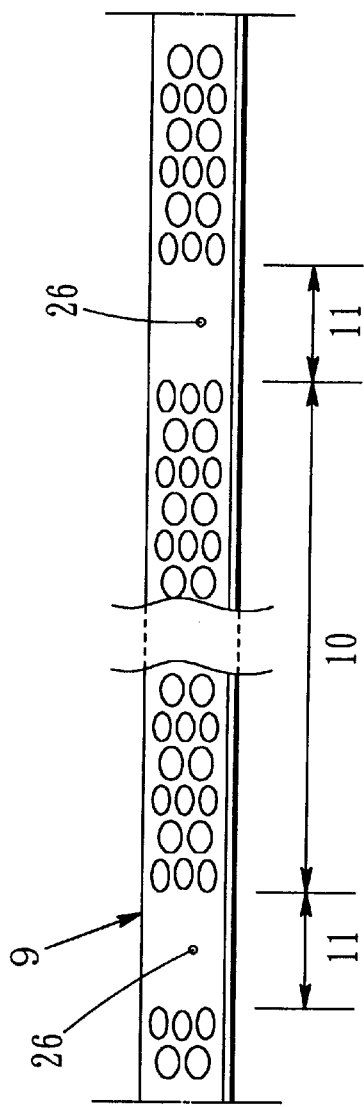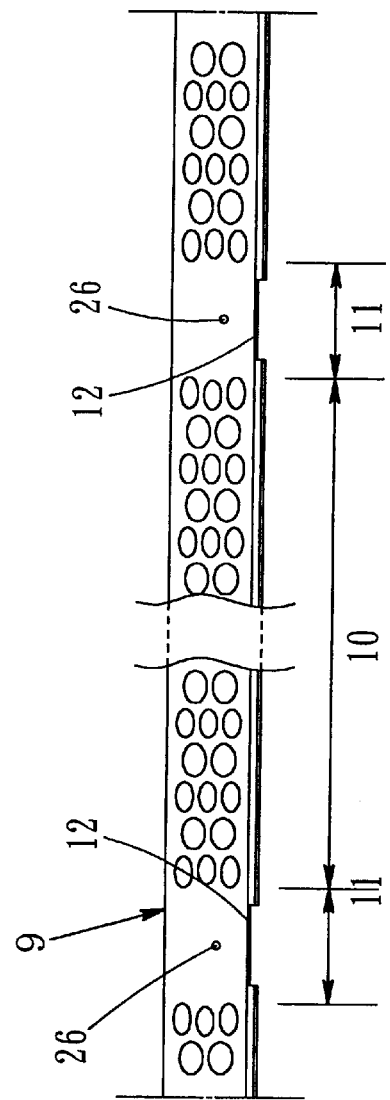

HEAT EXCHANGER TUBE MANUFACTURING METHOD

BACKGROUND OF THE INVENTION

1. Field of the Invention

This invention relates to a method of manufacturing heat exchanger tubes (for example, a radiator, a condenser or an evaporator for an automobile) from a plate material payed out continuously, and a dimpling roll used for the same manufacturing method.

2. Description of the Prior Art

A heat exchanger tube enables the heat on the inside and outside thereof to be exchanged with each other by a heating medium circulated inside thereof as the outflow of the heating medium to the outside of the heat exchanger tube is prevented, and cools an apparatus or an engine or sets the temperatures thereof constant. A heat exchanger tube is used for a radiator, a condenser or an evaporator of an automobile. To manufacture this heat exchanger tube, a method of, for example, Japanese Patent Laid-Open No. 028438/1992 is used.

The manufacturing method of Japanese Patent Laid-Open No. 028438/1992 is as follows. This method comprises a plate material dimple-molding step, a cutting step and a bending step, and, during the cutting step, some groups of dimples in a dimple-molded portion are removed, whereby the dimple-removed portions are formed into flat remolded portions corresponding to end portions to be cut of the plate material. A portion corresponding to an end portion to be cut is remolded into a flat portion so as to improve the sealability thereof as an end portion of a heat exchanger tube inserted into an insertion port of a heat exchanger and soldered thereto. According to the techniques which had been utilized before Japanese Patent Laid-Open No. 028438/1992 was published, dimples had also been molded in a cut end portion, so that the sealability of the same end portion soldered to a heat exchanger body had been low.

The invention disclosed in this Japanese Patent Laid-Open No. 028438/1992 can provide a heat exchanger tube capable of easily improving the sealability thereof with respect to a heat exchanger tube. However, since a tube body is formed by bending a plate material after the plate material is cut off, a bending process demands a high accuracy, and a bending operation is difficult to be carried out. This causes a fear of making a cut end portion deviate from an. insertion port of a heat exchanger body, and exerting a bad influence upon a cut end portion inserting operation. Moreover, the elongation, which occurs because cut plate materials flow on a production line, of the cut plate materials in the direction in which a raw plate material is payed out, and a scatter of the dimensional accuracy of cut end portions cannot be ignored. A heat exchanger tube usually demands a dimensional accuracy of ±0.2 mm. Therefore, the elongation of a plate material causes the dimensional accuracy of heat exchanger tubes to scatter. Under the circumstances, a heat exchanger tube manufacturing method has been including which is capable of solving these problems, and manufacturing a heat exchanger tube with a high accuracy as the sealability thereof as a heat exchanger tube inserted into a heat exchanger body is maintained.

SUMMARY OF THE INVENTION

The present invention relates to a heat exchanger tube manufacturing method for a production line, including a dimpling step of molding a plurality of dimples in a plate material, which is payed out continuously, so as to form the plate material into a molded plate material, a tube body manufacturing step of folding back the molded plate material around an axis extending in the direction in which the plate material is payed out, so as to form the molded plate material into an intermediate tube body, and a step of cutting this intermediate tube body into parts of a predetermined length, the dimpling step including providing the plate material with non-molded sections, in which the dimples are not molded, at predetermined intervals, the cutting step including cutting predetermined parts to be cut of the non-molded sections. The cutting step also includes forming recesses in cut end portions of heat exchanger tubes. The portions to be cut and the portions in which the recesses are to be formed of the intermediate tube body continuously fed are set on and provided in the non-molded sections thereof. To set and provide such portions, reference marks are provided in predetermined positions on the non-molded sections for the purpose of improving the processing accuracy.

According to the present invention, an intermediate tube body obtained by bending a plate material is cut first, so that the problems concerning the processing accuracy are solved. Namely, since the portion of a predetermined range of the plate material which extends from a cut end thereof to a certain extent is formed as a non-molded section, a remolding operation is not required, and both the processing accuracy and sealability of a tube end portion can be set to proper levels. Moreover, the non-molded sections absorb the elongation of the intermediate tube bodies flowing on a production line, and minimize a scatter of the dimensional accuracy of the cut ends. Since the portions to be cut are set additionally on the non-molded sections, the intervals of cut ends can be set certainly in agreement with the length of heat exchanger tubes. The non-molded sections are formed on a plate material by a dimpling roll which constitutes a processing unit used in a dimpling step when heat exchanger tubes are manufactured from a plate material continuously payed out, and which comprises a pair of toothed rolls having toothless non-molded surfaces the rolling cycles of which agree with each other.

BRIEF DESCRIPTION OF THE DRAWINGS

FIG. 6 is a plan view of an intermediate tube body obtained by folding back the molded plate material on a stage C in FIG. 1;

FIG. 7 is a plan view of the intermediate tube body provided with recesses in t -molded sections on a stage D in FIG. 1.

DESCRIPTION OF THE PREFERRED EMBODIMENT

Figure 1:
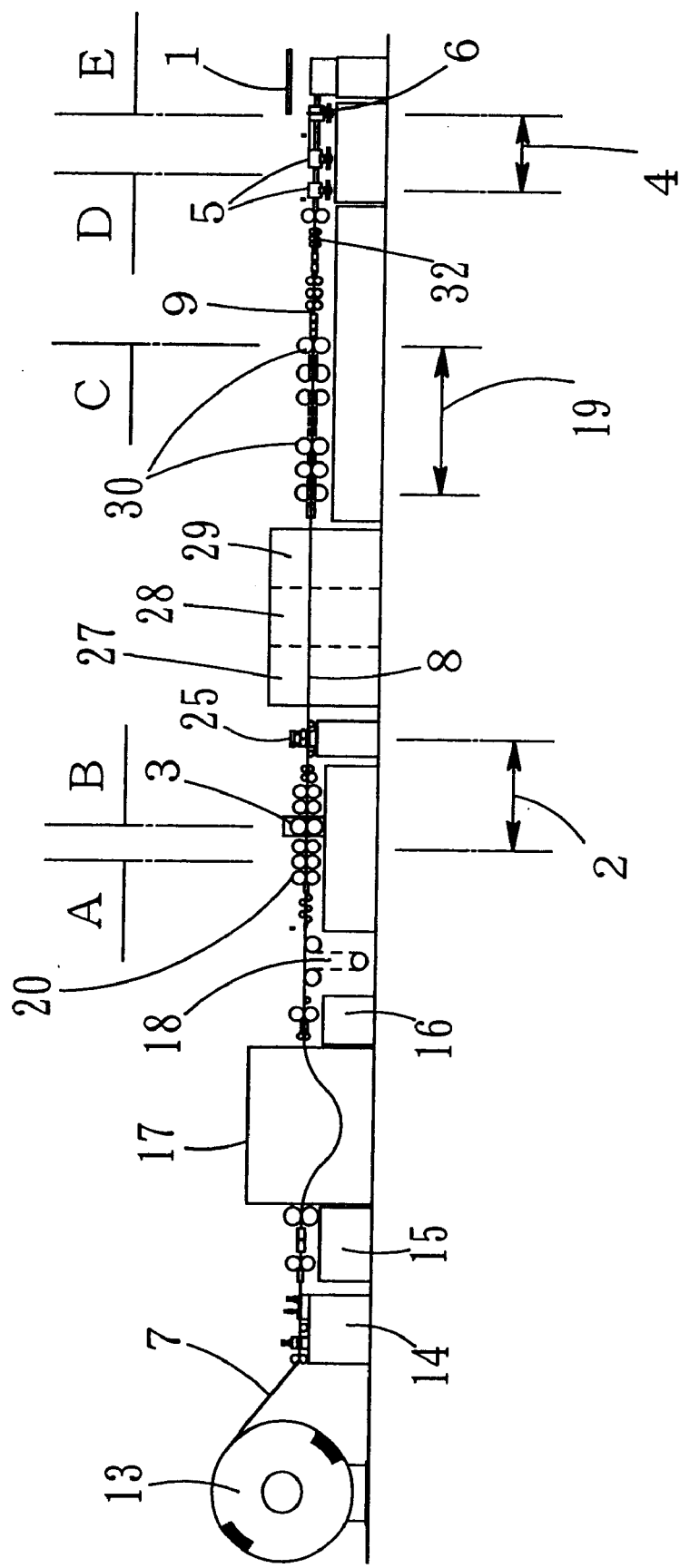
FIG. 1 is a construction diagram showing an example of a production line for heat exchange tubes to which the present invention is led.
Figure 4:
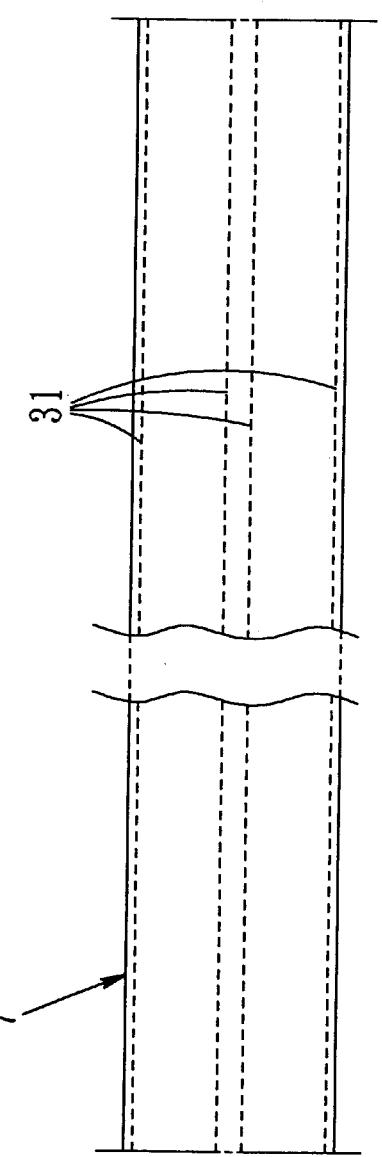
FIG. 4 is a plan view of a plate material finished being subjected to premolding on a stage A in FIG. 1.
Figure 5:
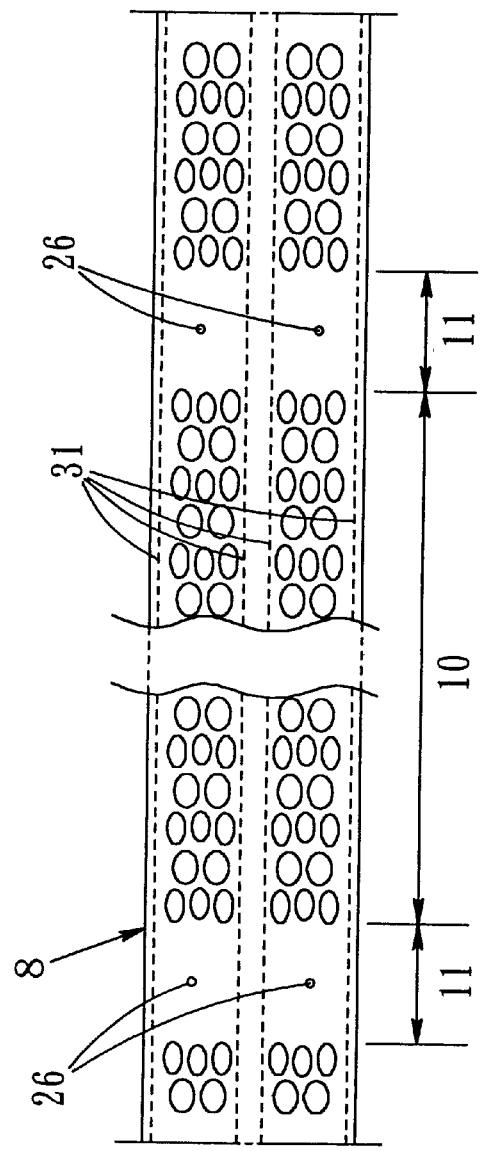
FIG. 5 is a plan view of a plate material finished being molded to have dimpled sections and non-molded sections, on a stage B in FIG. 1.

A production fine will be described with reference to FIG. 1. A plate material 7 constituting a raw material is payed out continuously from an uncoiler 13 toward the right side of FIG. 1. The plate material 7 flows from a hoop relay 14, passes through a looper 17 having an inlet side and an outlet side pinches 15, 16 at front and rear portions thereof, and is tension-regulated by a dancer roll 18, the resultant plate material reaching a dimpling stage 2. On the dimpling stage 2 in this embodiment, folding lines 31 extending in th direction in which the plate material is payed out are formed (refer to FIG. 4) on the plate material by a premolding roll so that a molded plate material 8 is bent easily on a tube body manufacturing stage 19, and dimpled sections 10 and non-molded sections 11 are formed (refer to FIG. 5) on the plate material 7 by the dimpling roll 3 which holds the plate material from the upper and lower sides thereof.

Figure 2:
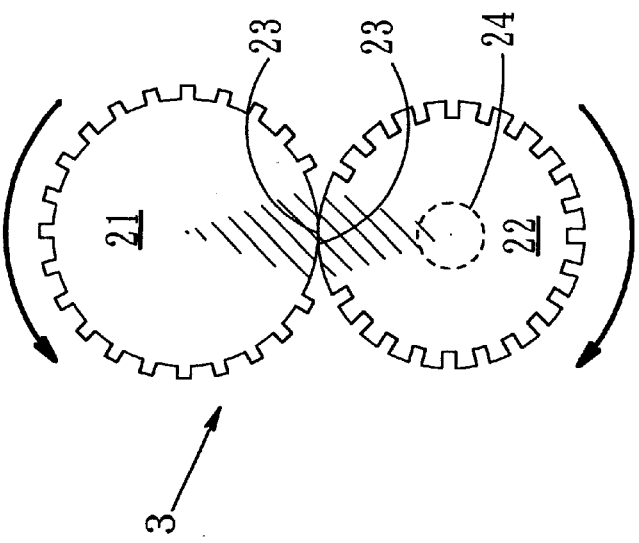
FIG. 2 is a side view of a dimpling roll provided on a dimpling stage.
Figure 3:
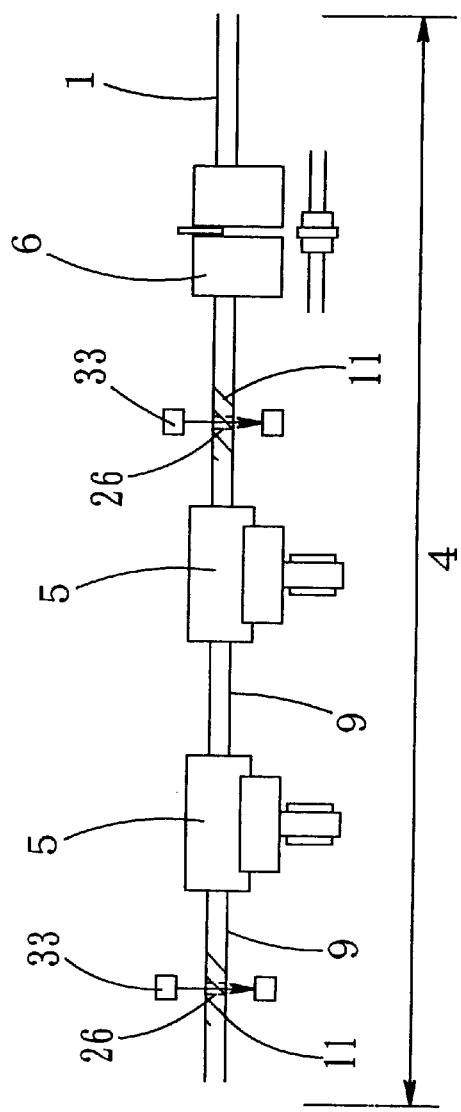
FIG. 3 is a side view showing the positional relation between recess forming , s and cutting units arranged in a cutting stage.

The dimpling roll 3 comprises a pair of toothed rolls 21, 22 the pitches of the teeth of which are different as shown in FIG. 2, and these rolls 21, 22 are provided with toothless non-molded surfaces 23, 23 the rolling cycles of which agree with each other. The lower toothed roll 22 is provided with an encoder 24, which observes the rotation thereof. The molded plate material 8 on which the dimpled sections 10. and non-molded sections 11 are thus formed is subjected to an operation for making marker holes 26, which constitute reference marks, in central parts of the non-molded sections 11 by a rotary press 25 placed on a subsequent stage.

The molded plate material 8 is cleaned through a cleaner 27, a roll coater 28 and a drier 29 to enter an intermediate tube body manufacturing stage 19. On the intermediate tube manufacturing stage 19, the molded plate material is folded back around an axis extending in the direction in which the plate material is payed out, to mold (refer to FIG. 6) the molded plate material 8 into an intermediate tube body 9 by a number of molding rolls 30. The molded plate material 8 is folded back along the folding lines 31, and both side edge sections thereof are superposed on each other to form an intermediate tube body 9. Before a cutting stage 4, a major roll 32 is provided.

Figure 8:
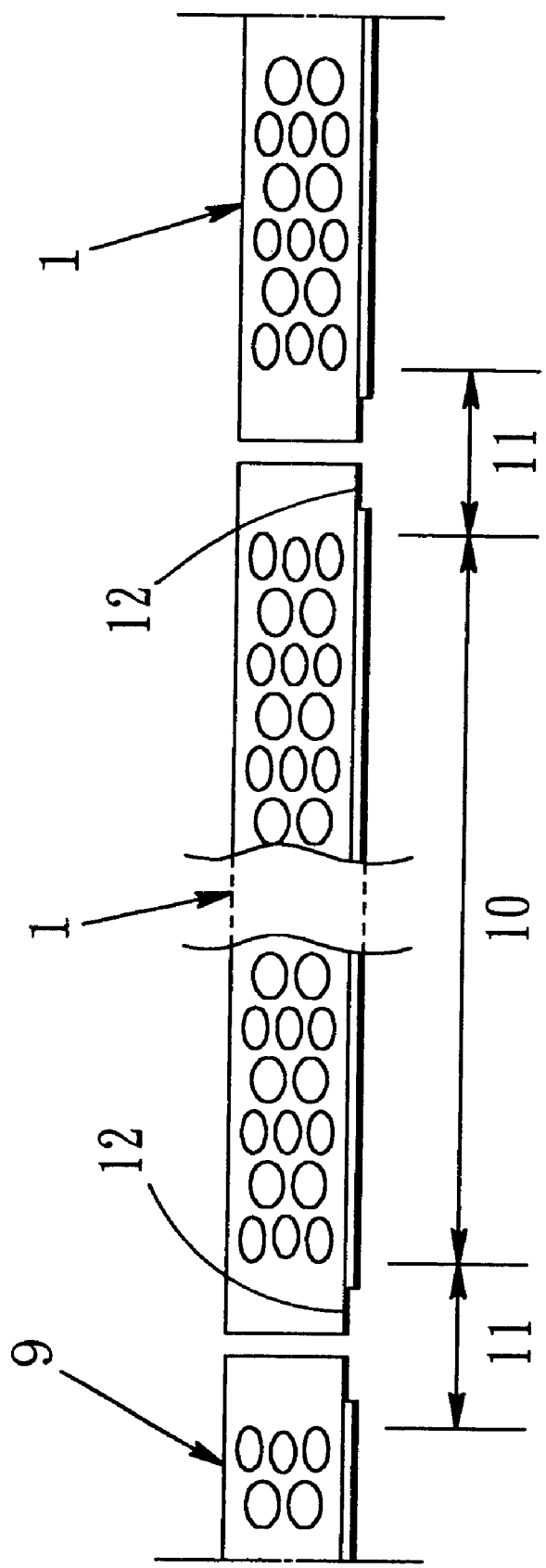
FIG. 8 is a plan view heat exchanger tubes completed by cutting the intermediate tube body on a stage E in FIG. 1.

The intermediate tube body 9 is subjected (refer to FIG. 7) on the cutting stage 4 to an operation for providing recesses 12, which correspond to the non-molded sections 11, by the recess forming units 5 with reference to the marker holes 26 as reference marks, and then cut (refer to FIG. 8) with a cutter 6. The marker holes 26 are paired so that they are vertically aligned onto each other when the molded plate material 8 is formed into the intermediate tube body 9. Optical sensors 33 are provided before the recess forming units S or the cutter 6 so that the optical sensors 33 are opposed to the marker holes 26. The optical sensors 33 detect the marker holes 26 to judge that the non-molded sections 11 have reached the recess forming units 5 or the cutter 6. In this embodiment, the recesses 12 are formed by two recess forming units 5, and heat exchanger tubes 1 of a product length (equal to a marker hole detection interval) are obtained sequentially by one cutter 6, by sending out the intermediate tube body 9 at intervals of detection of the marker holes 26. The recess forming unit and cutter may be provided singly with each at au interval equal to a product length, and also doubly whereby a product length may be determined by simultaneously operating the recess forming units or the cutters.

The present invention enables the sealability of a heat exchanger tube inserted into a heat exchanger body to be secured easily, and, moreover, a heat exchanger tube having a high processing accuracy to be provided. This is owing to the techniques for forming an already dimpled plate material into an intermediate tube body, and recessing and thereafter cutting the intermediate tube body at intervals each of which agrees with a product length. The capability of forming non-molded sections, at which an intermediate tube body is cut and recessed, in the dimpling step brings about the operation and effect of the invention. To attain a higher processing accuracy, reference marks are used, and such reference marks are also provided in the very non-molded sections, so that they can be distinguished easily from the dimples. Since the reference marks enable the cutting and recessing operations carried out at the non-molded sections to be effected accurately, the production line can be automated easily. Thus, the present invention achieves the automation of the production line easily, and improves the accuracy of processing each heat exchanger tube as the invention employs a continuous manufacturing mode.

What is claimed is:

1. A method of manufacturing heat exchanger tube comprising the steps of:

continuously providing a metal plate material;

dimpling the metal plate material provided continuously into molded sections having a plurality of dimples and non-molded sections without dimples at predetermined intervals in the metal plate material;

folding back the metal plate material around an axis Bonding in a direction in which the metal plate material is provided and for the metal plate material into an intermediate tube body, cutting the intermediate tube body into parts of a predetermined length; and wherein continuously providing said molded and non-molded sections of said metal plate material in every predetermined interval is accomplished by a pair of toothed rolls having toothless non-molded surfaces which correspond with each other.

2. The method according to claim 1 wherein the cutting t comprise:

continuously providing reference marks on said metal plate material at predetermined positions after dimpling;

detecting said reference marks; and cutting the non-molded sections of the intermediate tube body being sent sequentially out at intervals of said detection marks, thereby obtaining heat exchanger tubes of said predetermined length.

3. The method according to claim 1 wherein said reference marks comprise marker holes continuously provided on each of said non-molded sections after dimpling, said marker holes comprising a pair of opposing marker holes formed through the intermediate tube body during the forming of the intermediate tube body.

4. The method according to claim 1 wherein said marker holes are made in central pars of the non-molded sections by rotary press provided after dimpling.

5. The method according to claim 1 wherein said plate material is folded back by a plurality of molding rolls.

* * * * *